Patented Nov. 22, 1938

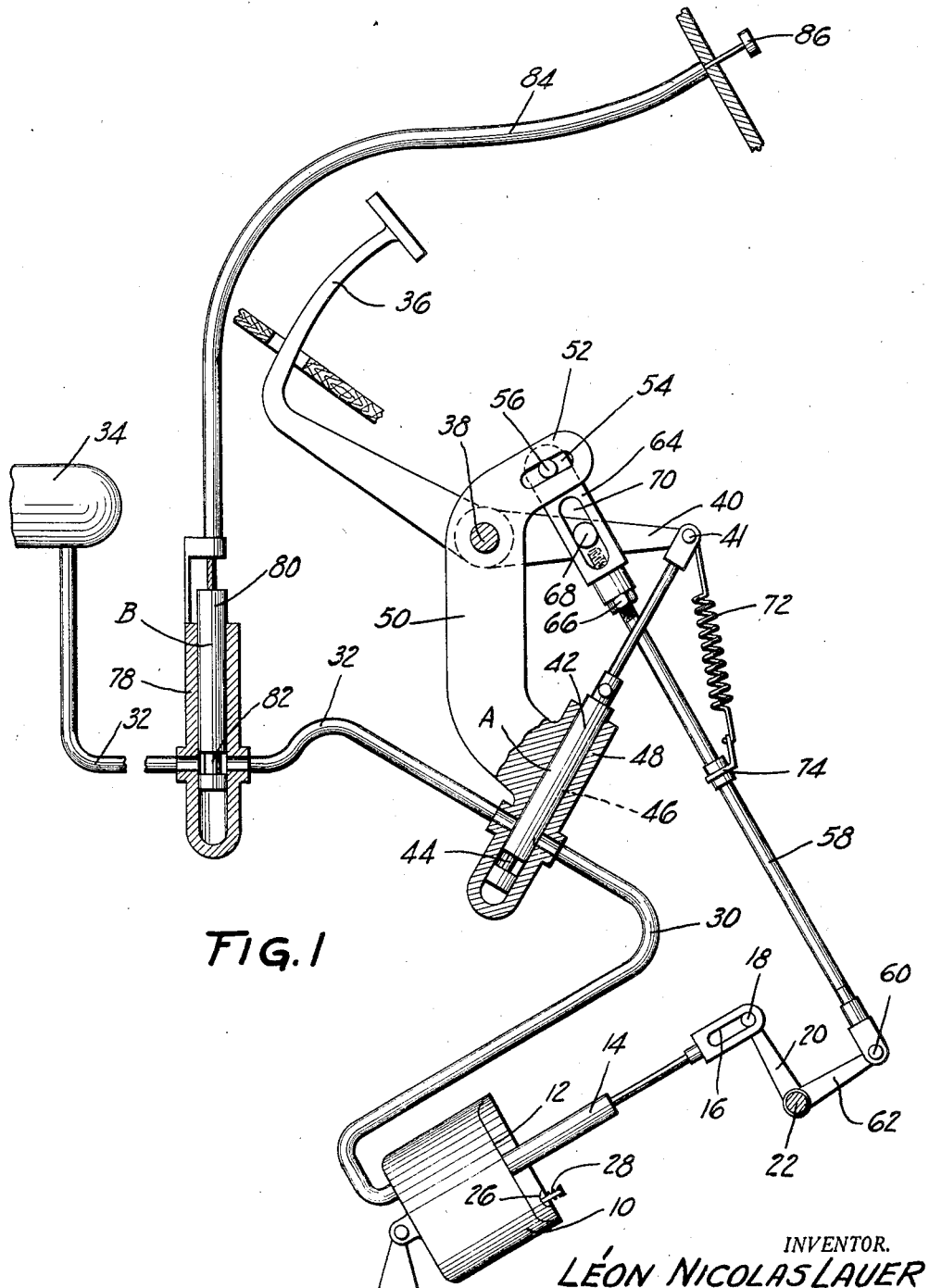

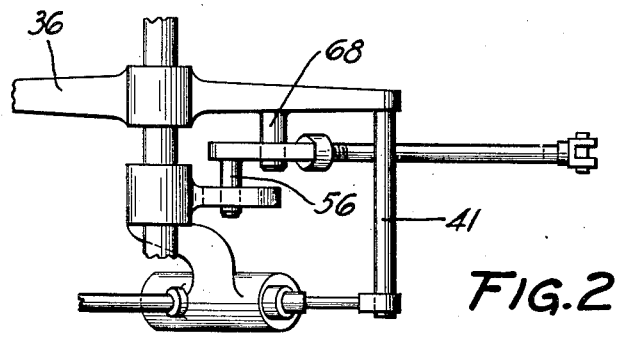
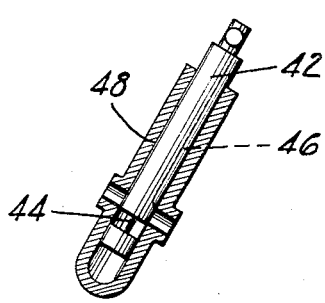
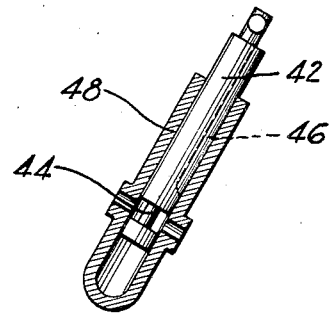
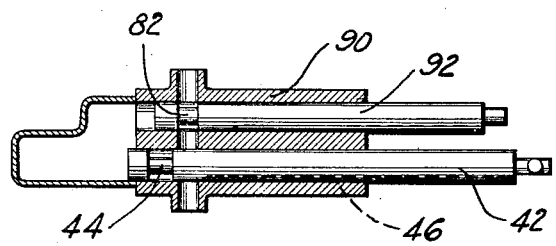

2,137,533

UNITED STATES PATENT OFFICE 2,137,533

SERVO-CLUTCH OPERATING MECHANISM

Léon Nicolas Lauer, Clichy, France, assignor to Bendix Products Corporation, South Bend, Ind., a corporation of Indiana Application December 10, 1934, Serial No. 756,875
In France December 13, 1933

2 Claims. (Cl. 121—41)

The invention relates to a clutch control mechanism and is conspicuous by the following characteristics taken singly or in combination.

1. It comprises a fluid operated servo-motor which is energized and deenergized by the conductor through the intermediary of one of the usual automobile controls, for instance the clutch pedal, in conjunction with a follow-up mechanism which permits the movement of the clutch to be regulated in accordance with the mode of pedal actuation.

2. It includes a pivoted valve casing operatively connected to the clutch and a pedal actuated valve plunger, the relative movement of valve casing and plunger permitting the motor to be communicated to vacuum to disengage the clutch, communicated to atmosphere to engage the clutch and cut off from both vacuum and atmosphere to immobilize the mechanism.

3. A flexible retractable connection between an element fixed to the clutch and the pedal and/or plunger biases the mechanism into clutch engaging position and provision is made whereby the physical effort of the conductor may be applied to the pedal to supplement the motor during the clutch disengaging stroke.

The invention relates to power operated means for controlling the engagement and disengagement of an automotive clutch mechanism in conjunction with one of the ordinary vehicle controls, for instance, in conjunction with the clutch operating pedal of the automobile.

A principal object of the invention is to provide a power actuated clutch operating mechanism which permits the operator, through the intermediary of one of the ordinary vehicle controls, to effectively control and graduate the clutch engagement and disengagement, while, at the same time, relieving the operator from all effort that manual operating of the clutch entails, yet permits simulation by means of power of the ordinary driver manipulation of the clutch pedal. The mechanism, although particularly adapted for utilization in conjunction with vehicles of the heavy type utilizing sturdy clutches with heavy clutch springs, lends itself readily nevertheless to the operation of any and all types of clutch installations wherein an actuation by power is deemed either necessary or desirable.

Other objects of the invention and desirable details of construction and combination of parts will become apparent from the following detailed description of a preferred embodiment of the invention taken in conjunction with the accompanying drawings, in which:

Figure 1 is a diagrammatic view of the control mechanism constituting the invention;

Figure 2 is a plan view of the mechanism showing the association of several of the elements thereof;

Figure 3 represents the mechanism control valve in clutch engaging position;

Figure 4 illustrates the control valve in clutch disengaging position; and

Figure 5 shows a combination of control valve and cut-out valve positioned side by side in a common casing.

As disclosed in the figures of the drawings, there is provided a vacuum operated fluid motor or actuator comprising a pivotally mounted cylinder 10 and a reciprocable piston 12, the latter connected by the rod 14 through the intermediary of a slotted connection 16 with a pin 18 carried by a lever arm 20 that is fixed to a shaft 22, through the rotation of which the vehicle clutch (not shown) is engaged or disengaged. An inwardly opening valve 26 is positioned on the end of the cylinder 10 and held under light pressure in closed position through the intermediary of a spring 28 in order to permit unrestricted clutch disengaging movement of the piston.

The cylinder 10 is connected through a flexible conduit 30 to a control valve broadly designated as A, which control valve is in turn connected through a flexible conduit 32 with the intake manifold 34 of an internal-combustion engine (not shown).

A pedal 36 which, in this instance, is represented as the ordinary automobile clutch pedal, but which obviously may be any other similar control element of the automobile, is pivoted on a cross shaft 38 and carries a prolongation 40 having a lateral arm 41 to the end of which is pivoted a plunger 42 of the control valve A. The plunger for a purpose which will hereinafter appear is provided with a waist portion 44 as well as a groove 46, the latter extending from a point adjacent to the waist 44 to a point external of the casing 48 of the control valve A. The valve A is mounted on an element 50 which is oscillatably positioned on the cross shaft 38, the element 50 likewise carrying an upwardly and laterally extending arm 52 provided with a slot 54 into which projects the pin 56 of a link 58 that is pivoted at its lower end 60 to a lever arm 62 fixed to the clutch operating shaft 22 and carries a bracket 74 between which and the arm 41 a spring 72 is stretched.

The link 58 carries a slotted head 64 adjustably mounted thereon through the intermediary of a threaded adjustable connection 66, and a pin 68 on the projection 40 of the clutch operating pedal 36 extends into a slot 70 of the slotted head and has a sliding connection therewith for a purpose which will hereinafter appear.

The operation of the device is as follows. When the clutch pedal 36 is depressed it pivots about cross shaft 38 and since the element 50 carrying the control valve A is fixedly positioned for the moment by means of the pin 56 in the slot 54, the plunger 42 is drawn out of the casing 48 of the valve against the tension of spring 72 and the communication through the groove 46 between the atmosphere and the conduit 30 is interrupted. Further depression of the clutch pedal results in further withdrawal of the plunger 42 until finally the waist portion 44 communicates conduits 30 and 32, thus establishing communication between the intake manifold 34 and the clutch motor 10.

The motor is now evacuated and air pressure operating on the opposite piston face urges it downwardly to inaugurate the clutch disengaging stroke, air being admitted through valve 26, and as the piston descends it operates lever 20 towards clutch disengagement. The pin 68 has now moved to the upper end of slot 70 so that the operator may if he so desires apply his physical effort to assist the power disengagement of the clutch, such effort being obviously transmitted from the clutch pedal to the clutch through the intermediary of pin 68, link 58, lever 62 and clutch shaft 22.

So long as the depression of the pedal 36 continues, maintaining spring 72 stretched and pin 68 adjacent the upper end of slot 70, the clutch disengaging stroke of the piston 12 progresses, for, as fast as link 58 is urged upwardly and effects through pin 56 in slot 54 counterclockwise oscillation of element 50 and the valve A, tending to move the valve casing 48 and plunger 42 relatively to cut off the vacuum communication through waist 44, the increased pedal depression maintains the vacuum communication and hence the piston in its clutch disengaging movement. If the pedal is held stationary, the rod 58 motivated by the piston 12 oscillates element 50 about shaft 38 causing relative movement of the parts to position the valve casing and plunger as illustrated in Figure 3, whereby the cylinder is cut off from both air and vacuum and the whole system immobilized.

On release of the clutch pedal the valve casing and plunger assume the relative positions to interrupt the vacuum communication of the motor and establish communication thereof with atmosphere through the intermediary of the groove 46, whereby the piston 12 under the pull of the clutch spring effects its stroke to the opposite end of the cylinder, thereby permitting the clutch to engage. If the return of the clutch pedal is interrupted the parts assume the positions wherein the motor is cut off both from the vacuum and atmosphere, whereby the ensemble is immobilized as heretofore explained.

It is obvious that there is hereby provided a simple, cheap and sensitive control responding to every condition and requirement for efficient operation wherein a facile power actuation is effected that simulates the ordinary manual clutch operation without the effort and fatigue that said manual actuation involves.

For cutting out the power operation of the clutch there is provided in the conduit 32 a valve broadly designated B, comprising a valve casing 78 having a plunger 80 slidable therein and having a waist capable of being positioned so as to communicate both branches of the conduit. The plunger may be actuated by a button 86 on the automobile dash through the intermediary of a connection 84 which may take the form of a Bowden wire. The slot 16 in the piston rod 14 permits manual clutch operation without drag from the piston 12.

In the arrangement of Figure 5 the cut-off valve and control valve are combined in a single unitary casing 90, the cut-off valve consisting of the plunger 92 provided with a waist portion 82 and the control valve comprising a plunger 42 provided with a waist portion 44 and a groove 46 in all respects similar to cut-off valve and the control valve hereinbefore described.

Although the invention has been described in connection with certain specific embodiments, the principles involved are suitable to numerous other applications that will regularly occur to one skilled in the art. It goes without saying that the mechanism is susceptible of combination with any of the known constructions for damping the clutch engagement without departing from the spirit and scope of the invention.

I claim:

1. Power means for operating one of the control elements of an automotive vehicle comprising a pressure differential operated motor including a fixed element and a movable power element, valve means for controlling the operation of said motor comprising relatively movable casing and plunger members, manually operable means for operating the valve means, linkage interconnecting said manually operable means, valve elements and the control element to be operated comprising a cross shaft adapted to serve as a mounting for said manually operable means, connections including a link operably connecting said manually operable means and valve plunger element, and other connections including a lever member mounted on said shaft, a slotted link member interconnecting the control element to be operated and lever, said slotted link member serving to interconnect said casing and control element to be operated, a pin mounted on said manually operable means, said pin mounted within the slot of the aforementioned link, said parts being so constructed and arranged as to provide a control valve of the follow-up type.

2. Power means for operating one of the control elements of an automotive vehicle comprising a pressure differential operated motor including a fixed element and a movable power element, valve means for controlling the operation of said motor comprising relatively movable casing and plunger elements, manually operable means for operating the valve means, linkage interconnecting said manually operable valve means and control element to be operated comprising a cross shaft adapted to serve as a mounting for said power control element, connections including a link positively connecting said manually operable means and valve plunger element, other connections including a lever arm mounted on said shaft and a slotted link for interconnecting said casing and lever arm, said parts being so constructed and arranged as to provide a control valve of the follow-up type, together with a pin on said manually operable member adapted to contact one end of the slot in the aforementioned slotted link to thereby provide means for aiding in the operation of the control element concurrently with an operation of the aforementioned manually operable member, and likewise to provide means for operating the control element solely by the physical effort of the driver in the event of the failure of the power means.

LÉON NICOLAS LAUER.